United States Patent [19]

Miller et al.

[11] Patent Number: 4,690,365
[45] Date of Patent: Sep. 1, 1987

[54] JACK STUD

[75] Inventors: John Miller, Huntington Station; Richard O. Barton, Levitown; Oscar H. Schaefer, Massapequa Park, all of N.Y.

[73] Assignee: Grumman Aerospace Corporation, Bethpage, N.Y.

[21] Appl. No.: 863,896

[22] Filed: May 16, 1986

[51] Int. Cl.$^4$ ............................................. F16M 13/00
[52] U.S. Cl. .................................. 248/650; 248/188.4; 248/669; 403/388; 403/408.1; 411/537
[58] Field of Search ............... 411/388, 389, 424, 378, 411/368, 149, 150, 155, 156, 402, 403, 538, 539; 248/649, 650, 677, 188.4, 669, 327; 403/408.1, 388, 389, 4

[56] References Cited

U.S. PATENT DOCUMENTS

| | | | |
|---|---|---|---|
| 2,333,518 | 11/1943 | Burkhardt | 411/544 |
| 2,440,211 | 4/1948 | Rothweiler | 248/180 |
| 2,660,083 | 11/1953 | Tyson | 411/402 X |
| 2,678,796 | 5/1954 | Roy | 248/358 |
| 2,768,805 | 10/1956 | Gribble | 248/509 |
| 2,912,564 | 11/1959 | Deffenbaugh et al. | 267/162 |
| 2,943,130 | 6/1960 | Lindner | 248/509 |
| 3,292,917 | 12/1966 | Sherburne | 267/162 |
| 3,424,413 | 1/1969 | Applegate | 248/188.4 X |
| 3,491,496 | 1/1970 | Johnston | 248/188.4 X |
| 3,521,413 | 7/1970 | Scott et al. | 411/424 X |
| 3,618,884 | 11/1972 | Wilson | 248/509 |
| 3,720,129 | 3/1973 | Lagasse | 411/402 |
| 3,856,242 | 12/1974 | Cook | 267/162 |
| 3,917,213 | 11/1975 | Poehlmann | 248/509 |
| 4,278,031 | 7/1981 | Dangschat | 248/188.4 |
| 4,334,815 | 6/1982 | Knohl | 411/389 X |

FOREIGN PATENT DOCUMENTS

| | | | |
|---|---|---|---|
| 1013535 | 7/1952 | France | 267/162 |
| 1325312 | 12/1963 | France | 411/403 |
| 385007 | 9/1973 | U.S.S.R. | 411/150 |

Primary Examiner—J. Franklin Foss
Assistant Examiner—David L. Talbott
Attorney, Agent, or Firm—Richard G. Geib; Daniel J. Tick; Bernard S. Hoffman

[57] ABSTRACT

A clamping device for setting a detail which has at least one oversized throughbore to a fixture base which has at least one threaded throughbore, the clamping device has six degrees of freedom, a longitudinally adjustable body portion which has an upper threaded portion and a lower threaded portion and is fixed in space so as to form a firm point for longitudinal rotation eliminating bending of the body portion during the setting, a flange disposed on the body portion which separates the upper threaded portion from the lower threaded portion, and a clamping arrangement disposed on the upper threaded portion of the body portion which provides single load line jacking and clamping to adjust and hold the detail in position with relation to the fixture base so that lockup of the clamping device and the detail is prevented.

12 Claims, 10 Drawing Figures

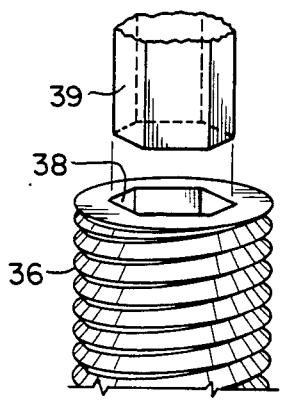
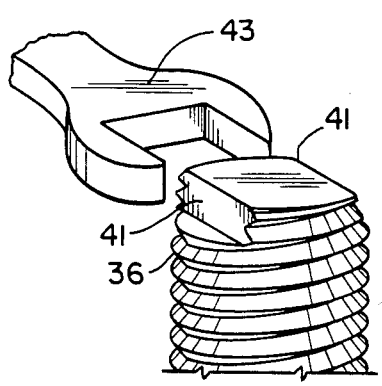
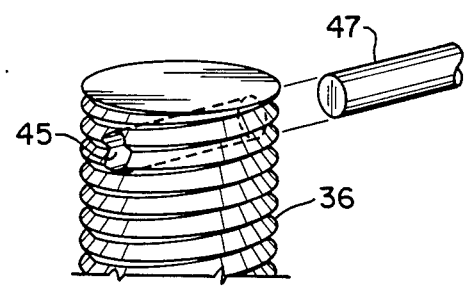
FIG.4　　　　FIG.5　　　　FIG.6
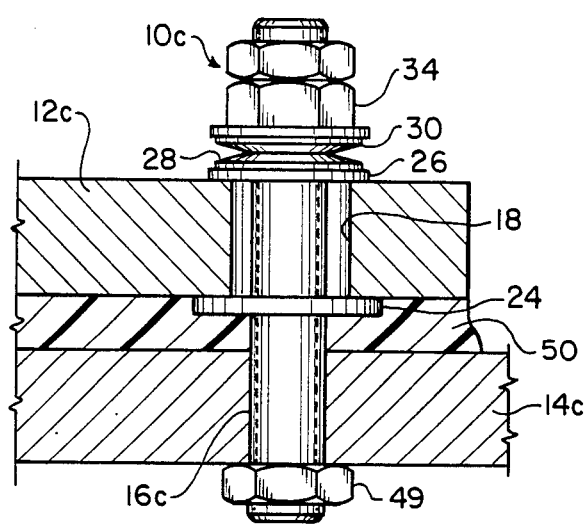
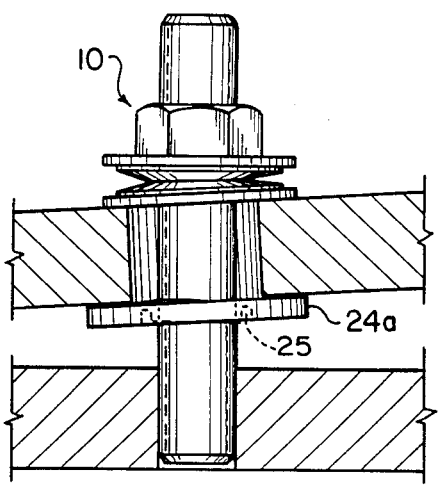
FIG.7　　　　　　　FIG.8
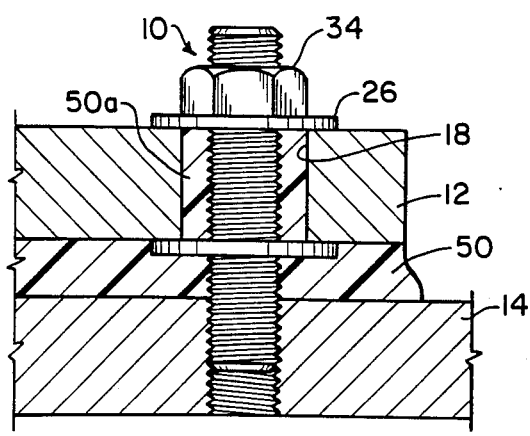
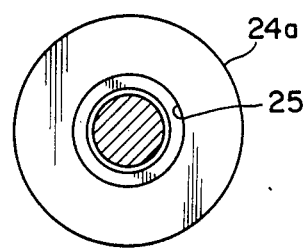
FIG.10　　　　　　FIG.9

JACK STUD

BACKGROUND OF THE INVENTION

1. Field of the Invention

The present invention relates to a clamping device. More particularly, it relates to a clamping device having six degrees of freedom.

2. Description of the Prior Art

The prior art teaches, in U.S. Pat. No. 4,061,298 to Kober, a centrally anchored aligning device for machines.

The patent to Kober relates to an aligning device for machines. A support body supporting a machine pedestal is guided in a threaded portion of a base body anchored to or in the ground and is penetrated centrally by a tension rod. The support body and the tension rod are interconnected through an entrainment device. The support body is arranged to be vertically adjusted with the machine placed thereon.

However, the patent to Kober teaches a machine tool using spherical washers. When the tool is moved in an angular direction, the spherical washers slide on each other creating an eccentric shaped throughbore which causes the tool to bend and "lock up." Additionally, the tool of Kober has only three degrees of freedom, and not six.

SUMMARY OF THE INVENTION

Accordingly, it is an object of the present invention to provide a clamping device which avoids the disadvantages of the prior art.

More particularly, it is an object of the present invention to provide a clamping device which reduces fixture detail setup time, enables the operator to "dial in" the detail to its zero location, and eliminates the problem of details moving or "creeping" after the potting operation.

In keeping with these objects, and with others which will become apparent hereinafter, one feature of the present invention resides, briefly stated, in a clamping device for setting a detail which has at least one oversized throughbore to a fixture base which has at least one threaded throughbore. The clamping device has six degrees of freedom, and having a longitudinally adjustable body portion with an upper portion and a lower portion which is fixed in space so as to form a firm point for longitudinal rotation so that bending of the body portion is eliminated during setting wherein clamping means are disposed on the upper portion of the body portion and provide single load line jacking and clamping to adjust and hold the detail in position with relation to the fixture base.

When the clamping device is designed in accordance with the present invention, lock-up of the clamping device and the detail is prevented while the clamping device traverses the six degrees of freedom.

In accordance with another feature of the present invention, the clamping device further includes a flange disposed on the body portion and separates the upper portion from the lower portion.

Another feature of the present invention is that the upper portion is threaded.

Still another feature of the present invention is that the lower portion is threaded.

Yet another feature of the present invention is that the lower portion and the upper portion are threaded.

Still yet another feature of the present invention is that the upper portion has a free end which contains a blindbore.

Yet still another feature of the present invention is that the upper portion has a free end which contains a hexagonally shaped blindbore.

Another feature of the present invention is that the clamping means includes two standard washers.

Still another feature of the present invention is that the clamping means includes two standard washers and two belleville spring washers.

Yet another feature of the present invention is that the clamping means includes two belleville spring washers disposed intermediate two standard washers and captivated by a standard hexagonal nut. The standard hexagonal nut and the belleville spring washers turn with the body portion and keep a constant clamping pressure on the detail with the flange providing a jacking surface and a clamping surface.

Still yet another feature of the present invention is that the upper portion has a free end which contains external flats so that any standard wrench may be applied.

Yet still another feature of the present invention is that the upper portion has a longitudinal axis and a free end which contains a throughbore disposed at a right angle to the longitudinal axis so that an appropriately sized round rod may be applied as a wrenching device.

Another feature of the present invention is that the flange contains a flexure groove which acts as a hinge when the clamping device is subjected to angular displacement during adjustment.

Finally, still a further feature of the present invention is that it provides an arrangement of clamping devices for setting a detail which has at least three oversized throughbores to a fixture base which has at least three threaded throughbores and which includes three clamping devices mounted on the fixture base in an orthogonal pattern in the three oversized throughbores of the detail. The clamping devices enter the three threaded throughbores in the fixture base so as to provide linear and angular adjustment of the detail. Screwing one of the clamping devices in and out of the fixture base will pitch or roll the detail while adjusting all of the three clamping devices in the same direction will adjust the height of the detail so that there is provided a single load line at each clamping device which eliminates stressing the detail and bending the clamping devices caused by asymetrical loading as the detail is being adjusted into position.

The novel features which are considered characteristic for the invention are set forth in particular in the appended claims. The invention itself, however, both as to its construction and its method of operation, together with additional objects and advantages thereof, will be best understood from the following description of specific embodiments.

BRIEF DESCRIPTION OF THE DRAWINGS

FIG. 4 is an isometric view of the hexagonally shaped blindbore disposed at the free end of the upper portion of the present invention, as shown in FIG. 1;

FIG. 5 is an isometric view of the external flats disposed at the free end of the upper portion of an alternate embodiment of the present invention; and FIG. 6 is an isometric view of the throughbore disposed at the free end of the upper portion of an alternate embodiment of the present invention together with the round rod.

FIG. 7 is a side view of an alternate embodiment of the present invention in which the clamping device of the present invention is securing a fixed detail to a movable fixture base.

FIG. 8 is a side view of an alternate embodiment of the present invention in which the flange has a flexure groove on its bottom face.

FIG. 9 is a plan view of an alternate embodiment of the present invention showing the flexure groove on the bottom face of the flange.

FIG. 10 is a side view in partial cross section of an alternate embodiment of the present invention in which after the liquid shim is applied and fully cured, each nut and its associated flat and spring washers are removed.

DESCRIPTION OF THE PREFERRED EMBODIMENT

Figure 1:
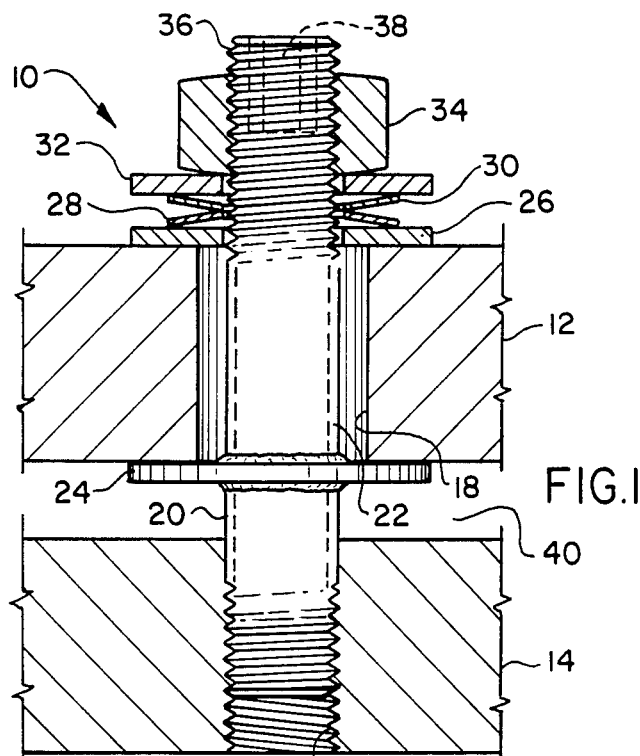
FIG. 1 is a side view in partial cross-section of the clamping device of the present invention.

Referring now to FIG. 1. the clamping device of the present invention is shown generally at 10 setting a detail 12 to a fixture base 14.

The fixture base 14 contains a threaded throughbore 16 and the detail 12 contains an oversized non-threaded throughbore 18. Because of the oversizing, the oversized non-threaded throughbore 18 provides for linear and angular adjustment of the clamping device 10.

The clamping device 10 includes a lower threaded portion 20 and an upper threaded portion 22. The upper threaded portion 22 is separated from the lower threaded portion 20 by a flange 24 which is preferably welded in place on the clamping device 10. As shown in FIGS. 8 and 9, the flange 24 may be modified to a flange 24a which contains a flexure groove 25 which acts as a hinge when the clamping device is subjected to angular displacement during adjustment. The flexure groove 25 is disposed concentrically to the flange 24a.

The non-threaded throughbore 18 has a diameter that is greater than the diameter of the threaded upper portion 22 of the clamping device 10. This allows the detail 12 to pivot on the clamping device 10, without bending the clamping device 10 as the detail 12 is adjusted to an angular position.

Disposed on the upper threaded portion 22, above the detail 12, is a first standard flat washer 26, spring means, preferably a first belleville spring washer 28, a second belleville spring washer 30, a second standard flat washer 32, and a standard hex nut 34. A wave spring washer or a compression spring, preferably with square ground ends may also be used for the spring means.

The upper threaded portion 22 of the clamping device 10 includes a free end 36. As shown in FIG. 4 the free end 36 contains a hexagonal shaped blind bore 38 which receives an adjustment bar 39 for turning and adjusting the height of flange 24 of the clamping device 10. As shown in FIG. 5, in place of the hexagonally shaped blindbore 38, the free end 36 may include external flats 41 to which any standard wrench 43 may be applied.

Additionally, as shown in FIG. 6, in place of the hexagonally shaped blindbore 38, the free end 36 may contain a throughbore 45 disposed at a right angle to the longitudinal axis of the upper portion 22, through which an appropriately sized round rod 47 may be applied as a wrenching device.

The clamping device 10 of the present invention is a device designed to provide single load line jacking and clamping and to adjust and hold the detail 12 in position in preparation for liquid shimming of gap 40.

As shown in FIG. 7, the clamping device 10c will function equally as well with the detail 12c as the fixed element 12c and detail 14c as the movable fixture element. The addition of locknut 49 prevents any movement of the movable element 14c due to backlash in threaded throughbore 16c.

The combination of the standard flat washers 26 and 32 and the belleville spring washers 28 and 30 stacked under the standard hex nut 34 provide a spring clamping force which holds the detail 12 against the flange 24 of the clamping device 10.

Clearance between the clamping device 10 and the throughbore 18 in the detail 12 allows angular and linear adjustment without bending or "locking up" the clamping device.

Figure 2:
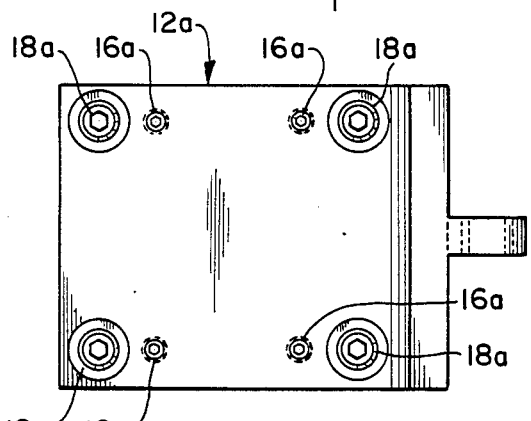
FIG. 2 is an orthographic projection of the prior art clamping device.

In the prior art, see FIG. 2, in order to jack and clamp a detail 12a to a fixture base 14a, four separate jack screws 16a and four separate clamping screws 18a are needed. The four separate jack screws 16a and the four separate clamping screws 18a create stresses in the detail 12a due to asymetrical loading, as shown by load lines 20a.

The prior art mentioned, supra, requires extensive detail set up time, has the disadvantage of detail "creeping" (moving) after the liquid shimming operation, and requires drilling eight separate holes. Additionally, the prior art requires constant tightening or loosening of the lock nut as the detail 12a is being adjusted into position. Furthermore, it may also experience "lock up" during vertical angular adjustment.

Figure 3:
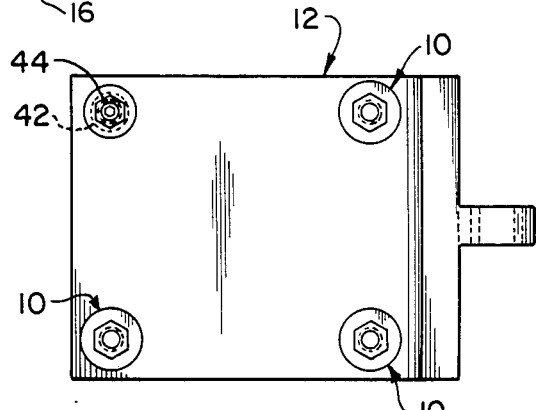
FIG. 3 is an orthographic projection of the present invention clamping device, as shown in FIG. 1, being used.
Figure 2A:
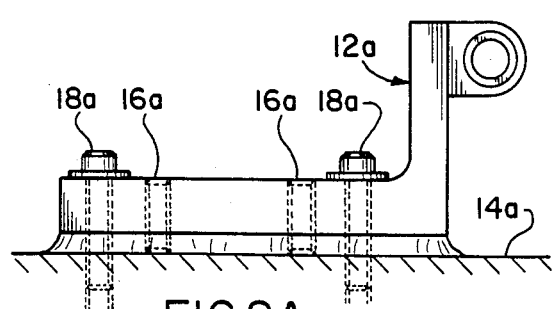
Figure 2B:
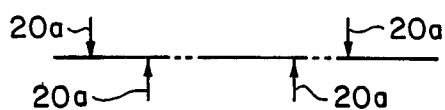
Figure 3A:
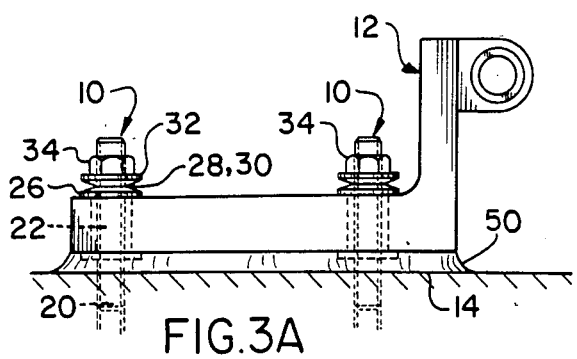
Figure 3B:

In operation, as shown in FIG. 3, in order to jack and clamp the detail 12 to the fixture base 14, only three separate clamping devices 10 are needed.

Three clamping devices 10 mounted on a fixture base 14 in an orthogonal pattern and sized so that they protrude through the oversized throughbores 18 in the detail 12 are required to provide linear and angular adjustment. Screwing one of the clamping devices 10 in and out of the fixture base 14 will pitch or roll the detail 12, while adjusting all the clamping devices 10 in the same direction will adjust the height of the detail.

Clearance between the clamping devices 10 and the oversized non-threaded throughbores 18 of the detail 12, allow angular and linear adjustment in the yaw and transverse axes. Final torquing of the standard hex nuts 34 of the clamping devices 10 "sets" the position of the detail 12 after the liquid shim 50 is applied and cured.

Usually four fasteners are required to insure the structural stability of the detail 12. Therefore, in most cases a fourth oversized throughbore 42 and just a standard set screw 44 with a nut and washer is used in addition to the three clamping devices in the fastening system, the nut and washer being applied after the liquid shim 50 is applied and cured. This arrangement enables the operator to "dial in" the detail 12 to its aligned location and eliminates stresses in the detail 12 due to in line loading, as shown by load lines 20b.

Furthermore, the use of the belleville spring washers 28 and 30 under the standard hex nuts 34 will captivate the detail 12 being set, without the need to constantly tighten or loosen the standard hex nuts 34 as the detail 12 is being adjusted into position. Due to friction, the standard hex nut 34 and belleville spring washer combination turn with the clamping device 10 and thus keep a constant clamping pressure on the detail 12, with the flange 24 of the clamping device 10 providing both a jacking surface and a clamping surface. This spring clamping arrangement is essential in preventing "lockup" during both linear and angular adjustment. The clamping devices 10 provide direct adjustment in three axes while further allowing freedom of motion for complete six axis positioning.

As shown in FIG. 10, after the liquid shim 50 is applied and fully cured, each nut 34 and its associated flat and spring washers 26, 28, 30 and 32 are removed from clamping device 10, in turn, and liquid shim 50 is applied to fill the oversize throughbore 18 thus providing shear strength to the joint. A single flat washer 26 and hex nut 34 are all that need be replaced on each clamping device 10 to maintain joint integrity.

It will be understood that each of the elements described above, or two or more together, may also find a useful application in other types of methods and constructions differing from the types described above.

While the invention has been illustrated and described as embodied in a clamping device, it is not intended to be limited to the details above, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A clamping device for setting a detail which has at least one oversized throughbore to a fixture base which has at least one threaded throughbore, said clamping device having six degrees of freedom, comprising:
   (a) a longitudinally adjustable body portion having an upper portion and a lower portion and being fixed in space so as to form a firm point for longitudinal rotation so that bending of said body portion is eliminated during setting;
   (b) an integral flange disposed on said body portion and separating said upper portion from said lower portion; and
   (c) clamping means including two Belleville spring washers disposed intermediate two standard washers under a standard hexagonal nut, said clamping means being disposed on said upper portion of said body portion and providing single load line jacking and clamping to adjust and hold the detail in position with relation to the fixture base while preventing lock-up of the clamping device and the detail as the detail traverses the six degrees of freedom, said clamping means and the oversized throughbore in the detail allow the detail to traverse the six degrees of freedom, said clamping means captivating the detail being set without constantly tightening or loosening said standard hexagonal nut as the detail is being adjusted into position both linearly and angularly, said clamping means turning with said body portion during adjustment and forming an integral unit so as to keep a continual clamping pressure on the detail throughout adjustment with said integral flange providing a jacking surface and a clamping surface.

2. A clamping device as defined in claim 1, wherein said upper portion is threaded.

3. A clamping device as defined in claim 1, wherein said lower portion is threaded.

4. A clamping device as defined in claim 1, wherein said lower portion and said upper portion are threaded.

5. A clamping device as defined in claim 1, wherein said upper portion has a free end which contains a blindbore.

6. A clamping device as defined in claim 1, wherein said upper portion has a free end which contains a hexagonally shaped blindbore.

7. A clamping device as defined in claim 1, wherein said clamping means includes two standard washers.

8. A clamping device as defined in claim 1, wherein said clamping means includes two standard washers and two belleville spring washers.

9. A clamping device as defined in claim 1, wherein said upper portion has a free end which contains external flats so that any standard wrench may be applied.

10. A clamping device as defined in claim 1, wherein said upper portion has a longitudinal axis and a free end which contains a throughbore disposed at a right angle to said longitudinal axis so that an appropriately sized round rod may be applied as a wrenching device.

11. A clamping device as defined in claim 1, wherein said flange contains a flexure groove which acts like a hinge when the clamping device is subjected to angular displacement during adjustment.

12. An arrangement of clamping devices for setting a detail which has at least three oversized throughbores to a fixture base which has at least three threaded throughbores comprising three clamping devices mounted on the fixture base in an orthogonal pattern in the three oversized throughbores of the detail and entering the three threaded throughbores in the fixture base so as to provide linear and angular adjustment of the detail, screwing one of the clamping devices in and out of the fixture base will pitch or roll the detail while adjusting all of the three clamping devices in the same direction will adjust the height of the detail so that there is provided a single load line at each clamping device which eliminates stressing the detail and bending the clamping devices caused by asymetrical loading as the detail is being adjusted into position, each of said clamping devices having six degrees of freedom and comprising a longitudinally adjustable body portion having an upper portion and a lower portion and being fixed in space so as to form a firm point for longitudinal rotation so that bending of said body portion is eliminated during setting, an integral flange disposed on said body portion and separating said upper portion from said lower portion, clamping means including two Belleville spring washers disposed intermediate two standard washers under a standard hexagonal nut, said clamping means being disposed on said upper portion of said body portion and providing single load line jacking and clamping to adjust and hold the detail in position with relation to the fixture base while preventing lock-up of the clamping device and the detail as the detail traverses the six degrees of freedom said clamping means and the oversized throughbore in the detail allow the detail to traverse the six degrees of freedom, said clamping means captivating the detail being set without constantly tightening or loosening said standard hexagonal nut as the detail is being adjusted into position both linearly and angularly, said clamping means turning with said body portion during adjustment and forming an integral unit so as to keep a continual clamping pressure on the detail throughout adjustment with said integral flange providing a jacking surface and clamping surface.

* * * * *